United States Patent
Bayard et al.

(10) Patent No.: US 6,882,964 B2
(45) Date of Patent: Apr. 19, 2005

(54) HIGH ACCURACY INERTIAL SENSORS FROM INEXPENSIVE COMPONENTS

(75) Inventors: David S. Bayard, Glendale, CA (US); Scott R. Ploen, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 67 days.

(21) Appl. No.: 10/383,475

(22) Filed: Mar. 6, 2003

(65) Prior Publication Data

US 2003/0187623 A1 Oct. 2, 2003

Related U.S. Application Data

(60) Provisional application No. 60/362,502, filed on Mar. 6, 2002.

(51) Int. Cl.[7] .................................................. A61N 1/36
(52) U.S. Cl. ........................ 702/191; 600/484; 702/190
(58) Field of Search ......................... 702/19, 190, 191; 356/350, 460, 462, 464; 600/17, 376, 483, 484, 509, 510, 511–514; 701/1, 13, 214, 222, 226; 244/164, 165, 171

(56) References Cited

U.S. PATENT DOCUMENTS

| | | | | |
|---|---|---|---|---|
| 4,828,389 A | * | 5/1989 | Gubbins et al. ............. | 356/462 |
| 5,157,461 A | * | 10/1992 | Page ........................... | 356/462 |
| 5,262,843 A | * | 11/1993 | Sugarbaker et al. ........ | 356/464 |
| 5,626,140 A | * | 5/1997 | Feldman et al. ............ | 600/484 |
| 6,115,624 A | * | 9/2000 | Lewis et al. ................ | 600/376 |
| 6,356,815 B1 | * | 3/2002 | Wu et al. .................... | 701/13 |
| 6,577,952 B2 | * | 6/2003 | Geier et al. ................. | 701/214 |
| 2002/0111717 A1 | * | 8/2002 | Scherzinger et al. ........... | 701/1 |

* cited by examiner

*Primary Examiner*—Carol S W Tsai
(74) *Attorney, Agent, or Firm*—Daniel L. Dawes; Myers Dawes Andras & Sherman LLP

(57) ABSTRACT

An analytical apparatus for optimally combining measurements from N individual rate sensing devices or gyros into a single rate estimate significantly improves performance over that of any individual component device. Kalman filtering is used to combine rate sensed devices optimally in the sense of minimizing the variance of the rate error. The Riccati differential equation (RDE) associated with combining a collection of rate sensed devices is completely and exactly solved to derive to the matrix RDE. This analytic solution serves as the key for understanding all of the theoretical properties of the optimal filter, and provides a complete characterization of the final virtual rate sensed performance. In addition, the analytic RDE solution allows many practical problems to be solved that have proved essential for developing successful filter implementations. A discrete-time minimum variance filter implementation combines sensor measurements optimally.

21 Claims, 6 Drawing Sheets

HIGH ACCURACY INERTIAL SENSORS FROM INEXPENSIVE COMPONENTS

RELATED APPLICATIONS

The present application is related to U.S. Provisional Patent Application Ser. No. 60/362,502, filed on Mar. 6, 2002, which is incorporated herein by reference and to which priority is claimed pursuant to 35 USC 119.

BACKGROUND OF THE INVENTION

1. Field of the Invention

The invention relates to the field of gyroscopic instrumentation and in particular to processing the information to improve accuracy of the gyroscopic data.

2. Description of the Prior Art

Small, lightweight, and low-power devices are needed for accurate inertial sensing in a wide range of planned future NASA missions requiring guidance, control and inertial navigation functions (e.g., Mars missions, small body landing, rendezvous and docking, planetary ascent, precision landing, atmospheric entry, aeromaneuvering, aerocapture, etc.). and reduce mass and power requirements in emerging low-cost microspacecraft missions.

Emerging microelectromechanical systems (MEMS) are known to have smaller size, lower weight and less power consumption than their discrete counterparts, and in many ways hold the potential for providing the desired capabilities. Unfortunately, present state-of-the-art MEMS devices have low-grade performance and cannot compete with established sensors in such high-accuracy application areas. However, one important aspect of MEMS devices is that they are small and can be fabricated in large numbers on a single chip.

One object of the invention is to create a "virtual sensor" by combining many individual inertial sensing devices (e.g., gyros/accelerometers) into a single effective device. The resulting device would have performance properties surpassing the properties of any individual device.

Allan, Ashby and Hodge attempted in 1998 with some success to combine three inexpensive Sports stopwatches D. W. Allan et.al., "*Fine-Tuning Time In The Space Age,*" IEEE Spectrum, pp. 42–51, March 1998.

BRIEF SUMMARY OF THE INVENTION

The invention is a systematic method to combine multiple gyro devices so that the collective performance is potentially better than that of any single device. In practice, the measurements from many inexpensive MEMS devices on a single chip can be analytically combined in a real-time processing filter to raise their performance from low-grade to high grade, and command a much wider range of applications.

The basic prior art approach of Allan was to study the behavior of the three sports watches relative to coordinated universal time (UTC) time, and relative to each other. This formed a basis for combining them into an improved time estimate. The present approach is different in at least two important ways. First, gyro rate measurements are combined rather than time measurements. Second, a minimum-variance estimation approach and Kalman filtering are used to provide a systematic theory and implementation for combining devices. The Kalman filtering approach has the advantage of being a systematic method to ensure a minimum variance rate estimate.

The invention utilizes the collective behavior of multiple MEMS devices to offset deficiencies occurring at the single-device level, thereby improving overall performance to the point where they can be considered as a competitive technology for future NASA/JPL missions, aircraft, land vehicles and underwater craft.

The main theoretical result is a complete optimal minimum variance method for combining and filtering measurements from multiple gyro devices. An optimal filter combines and smoothes multiple gyro measurements to produce a minimum-variance rate estimate. This rate estimate is denoted as a "virtual gyro" since it is indistinguishable from an actual rate measurement taken from a single physical gyro having improved performance.

The gain matrix of the minimum-variance filter is an important quantity because it prescribes how the measurements are weighted and smoothed with respect to each other. According to Kalman theory, the gain matrix of the optimal filter is uniquely specified by the filter covariance which propagates according to a matrix Riccati differential equation (RDE). An important contribution of this research effort is the complete and exact analytical solution to the virtual gyro Riccati differential equation. This takes a large step toward understanding virtual gyros and being able to synthesize them in practice. The analytic solution reveals a wealth of theoretical properties, and leads, for example, to a simple parallel resistor analogy for understanding how the component gyro drifts add to form the overall virtual gyro drift. The analytic solution also leads to an important discrete-time implementation of the minimum variance filter.

For example, an interesting case study is given where four gyros, each with 8.6 degrees per hour drift, are combined to give a virtual gyro drift of 0.062 degrees per hour. This indicates a factor of over 100 times improvement. While performance is generally problem specific, results indicate that substantial improvement is possible when there are favorable correlations between the component devices.

More specifically the invention is defined as a method of processing signals from multiple gyros each having a rate, in order to derive a higher accuracy output signal. The method of processing signals comprising the steps of measuring the rate of multiple gyro signals, and combining the measured rates using a recursive processing filter whose properties are optimized using the statistical correlations and noise characteristics of the multiple rate sensing devices. A specific method for recursive processing is based on a steady state Kalman filter to generate a minimum variance rate estimate.

Consider N single-axis gyros, each of which provides a noisy measurement $y_i$ of the true angular rate $\omega$, i.e., $$y_i = \omega + b_i + n_{1i}, \; i=1, \ldots, N$$

where $b_i$ and $n_{1i}$ denote noises associated with the ith device. Specifically, the term $n_{1i}$ is a delta-correlated noise process on the ith device, called the angle-random walk (ARW). The term $b_i$ is a slowly varying random quantity called the gyro bias. The gyro bias for the ith device is modeled by, $$\dot{b}_i = n_{2i}$$

where the term $n_{2i}$ is a delta-correlated noise process called the rate-random walk (RRW). Let 1 denote an N vector completely containing ones, i.e., $$1 \triangleq \begin{bmatrix} 1 \\ \vdots \\ 1 \end{bmatrix}$$

With this notation, it is convenient to "stack" the above relations and write the collection of measured signals in the following vectorized form, $$y = b + 1\omega + v$$

$$\dot{b} = w_b$$

where $y = [y_1, y_2, \ldots, y_N]^T$ is an N vector comprised of the measured signals (i.e., the virtual gyro input signals) from N gyros; $b = [b_1, \ldots, b_N]^T$ is the vector of gyro biases; $\omega$ is the true rate (common to all gyro devices); $v = [n_{11}, n_{12}, \ldots, n_{1N}]^T$ is a vector of ARW component noises; and $w_b = [n_{21}, n_{22}, \ldots, n_{2N}]^T$ is a vector of RRW component noises. The true rate $\omega$ is modeled as a random walk of the form, $$\dot{\omega} = w_\omega$$

where $w_\omega$ is a delta-correlated noise process.

An N+1 dimensional state vector will be defined as, $$x = \begin{bmatrix} b \\ \omega \end{bmatrix}$$

so that the measurement vector y can be written equivalently as, $$y = Hx + v$$

where H is the N×(N+1) matrix given by, $$H = [I \vdots 1]$$

and where I denotes the N×N identity matrix. It is also convenient to define a N+1 selection vector $e_{N+1}$ that contains all zeros except for a one in the last place, i.e., $$e_{N+1} = \begin{bmatrix} 0 \\ 0 \\ \vdots \\ 1 \end{bmatrix}$$

The selection vector is useful for extracting the rate signal from the state vector as, $$\omega = e_{N+1}^T x$$

Two important quantities are the covariance matrices R and Q which are defined as follows, $R \triangleq \mathrm{Cov}[v]$ is an N×N covariance matrix of the ARW noise. The matrix R can have off-diagonal terms to account for correlations between the component ARW noises of different gyros.

$$Q \triangleq \begin{bmatrix} Q_b & 0 \\ 0 & q_\omega \end{bmatrix}$$

is an augmented RRW matrix, where $Q_b \triangleq \mathrm{Cov}[w_b]$ is the N×N covariance matrix of the RRW noise $w_{bi}$, and $q_\omega = \mathrm{Cov}[w_\omega]$ is the scalar covariance of the delta-correlated noise $w_\omega$ used in the model of the true rate $\omega$. The matrix $Q_b$ can have off-diagonal terms to account for correlations between the component RRW noises of different gyros.

Several key matrix quantities are computed directly from the ARW matrix R and the augmented RRW matrix Q. Specifically, these are the (N+1)×(N+1) matrices A, D and S, the (N+1)×N matrix $\overline{A}$, and the N×N matrix $\overline{D}$. Details on how these matrices are computed are treated in detail in Bayard, and will be summarized in the detailed invention description section. However, an important new innovation is that the matrices $A, \overline{A}, D, \overline{D}, S$ can be computed analytically without having to numerically integrate a nonlinear matrix Riccati equation. This represents a sharp break with standard Kalman filtering approaches, yet is critical for realizing the minimum-variance filter in practice, since the Riccati equation diverges with time making it impossible to otherwise implement a steady-state filter using finite-precision arithmetic.

Once the matrices $A, \overline{A}, D, \overline{D}, S$ are available, the gain matrix $K_\infty$ for the continuous-time minimum-variance filter and the gain matrix $\overline{K}$ for the discrete-time minimum-variance filter can be computed as follows, $$K_\infty = Q^{1/2} \overline{A} \; \overline{D}^{-1/2} \overline{A}^T Q^{1/2} H^T R^{-1}$$

$$\overline{K} = Q^{1/2} \overline{A} \overline{D}^{-1/2} \left( I - e^{-\overline{D}^{\frac{1}{2}} T} \right) \overline{A}^T Q^{1/2} H^T R^{-1}$$

Here, the notation $X^{-1}$, $X^{1/2}$, $X^T$, $e^X$ denotes the matrix inverse, matrix square-root, matrix transpose, and matrix exponential, respectively, for an arbitrary square positive definite or semi-definite matrix X.

The gain matrices $K_\infty$ and $\overline{K}$ are used in conjunction with the $A, \overline{A}, D, \overline{D}, S$ matrices to give the continuous-time and discrete-time filter implementations summarized below.

Continuous-Time (i.e., Analog) Implementation of Minimum-Variance Filter

Continuously-sampled analog measurements from multiple gyros, denoted as y(t), are processed in a minimum-variance filter defined by the following system of differential equations, $$\dot{\hat{\xi}} = \begin{bmatrix} -\overline{D}^{\frac{1}{2}} & 0 \\ 0 & 0 \end{bmatrix} \hat{\xi} + S^{-1} K_\infty y$$

$$\hat{\omega} = e_{N+1}^T S \hat{\xi}$$

where $K_\infty$ is the minimum-variance gain matrix, $\hat{\xi}$ is the continuous-time filter state vector of dimension N+1, $\hat{\omega}$ is the optimized minimum-variance rate estimate (i.e., the resulting virtual gyro output signal).

Comments

The filter state $\hat{\xi}$ is a minimum-variance estimate of $\xi$ which is defined by the transformation $\xi = S^{-1} x$ of the true state x. This transformation is important because it explicitly isolates the pure integral action so that practical measures can be taken to ensure that it is not destabilized by numerical round-off errors in the implementation. Two such practical methods are given below denoted as (i) and (ii), without which the minimum-variance filter would not be realizable with finite-precision arithmetic.

(i) The last row of the matrix product $S^{-1} K_\infty$ will be exactly zero, according to the new analytical solution. Accordingly, the implementation requires that the last row of $S^{-1} K_\infty$ (after it is computed arithmetically) be explicitly set to zero. This avoids destabilizing effects due to imperfect finite-arithmetic errors in the computation.

(ii) The isolated "0" in the lower right-hand corner of the matrix $$\begin{bmatrix} -\overline{D}^{\frac{1}{2}} & 0 \\ 0 & 0 \end{bmatrix}$$

in the filter implementation should be set to zero using the full numerical precision available on the machine or apparatus implementing the filter, to ensure (using finite-precision arithmetic) that for any finite-precision number a the result of multiplication is a·0=0.

Discrete-Time (i.e., Digital) Implementation of Minimum Variance Filter

Time-sampled measurements from multiple gyros, denoted as y(kT) for the kth time instant, are processed in a minimum-variance filter given by the following recursive equations, $$\hat{\xi}((k+1)T) = \begin{bmatrix} e^{-\overline{D}^{\frac{1}{2}}T} & 0 \\ 0 & 1 \end{bmatrix} \hat{\xi}(kT) + S^{-1}\overline{K}y(kT)$$

$$\hat{\omega}(kT) = e_{N+1}^T S \hat{\xi}(kT)$$

where $\overline{K}$ represents the minimum variance gain matrix; T is the sampling period, $\hat{\xi}$ is the discrete-time filter state vector of dimension N+1, $\hat{\omega}(kT)$ is the optimized minimum-variance rate estimate (i.e., the resulting virtual gyro output signal) at time instant kT.

Comments

The discrete-time filter state $\hat{\xi}(kT)$ is a minimum-variance estimate of $\xi(kT)$ which is defined by the transformation $\xi(kT)=S^{-1}x(kT)$ of the true state x. This transformation is important because it explicitly isolates the pure integral action so that practical measures can be taken to ensure that it is not destabilized by numerical round-off errors in the implementation. Two such practical methods are denoted as (i) and (ii) below, without which the minimum-variance filter would not be realizable with finite-precision arithmetic.

(i) The new theory dictates that the last row of the matrix product $S^{-1}\overline{K}$ will be exactly zero. Accordingly, the implementation requires that the last row of $S^{-1}\overline{K}$ (after it is computed arithmetically) be explicitly set to zero. This avoids destabilizing effects due to imperfect finite-arithmetic errors in the computation.

(ii) The isolated "1" seen in the lower right-hand corner of the matrix $$\begin{bmatrix} e^{-\overline{D}^{\frac{1}{2}}T} & 0 \\ 0 & 1 \end{bmatrix}$$

should be set to unity using the full numerical precision available on the machine implementing the filter, to ensure (using finite-precision arithmetic) that for any finite-precision number a the result of multiplication is a·1=a.

The step of combining the measured rates of the multiple gyros using a steady state Kalman filter to generate a minimum variance rate estimate can also be said to comprise the steps of: sampling N analog signals from the N gyros over a period of T seconds; digitizing the sampled N signals into a digital data point for each sampling period T for each gyro; assembling the N digitized signals from the N gyros into the N-vector y(kT); processing y(kT) by multiplying it with the matrix $\overline{K}$ to generate the product signal $\overline{K}y(kT)$; processing the $\overline{K}y(kT)$ signal by multiplying it with a matrix $S^{-1}$ to generate the product signal $S^{-1}\overline{K}y(kT)$; inputting the $S^{-1}\overline{K}y(kT)$ product signal during a kth sampling period into a first input of a summing node having two inputs; outputting the sum of the two inputs of the summing node to a delay operator; delaying the contents of the delay operator by one sampling period, T; feeding back the delayed output of the delay operator to a smoothing matrix operator modeled by $$\begin{bmatrix} e^{-\overline{D}^{\frac{1}{2}}T} & 0 \\ 0 & 1 \end{bmatrix}$$

to generate a feedback signal; inputting the feedback signal to a second one of the inputs to the summing node such that it is added to the $S^{-1}\overline{K}y(kT)$ product signal generated in the k+1 sampling period; processing the contents of the delay operator for the kth sampling period by multiplying it with a matrix S operator to generate a vector output signal; and extracting the last matrix element of the vector output signal as the best estimate of the virtual gyro rate $\hat{\omega}(kT)$ for the kth sampling point.

The invention is also to be understood as comprising an apparatus for performing each of the foregoing steps. The means for performing the steps may be comprised of appropriately designed logic circuits, firmware controlled digital processors and/or software controlled computers in any combination desired among the various steps and means.

While the invention has been specifically described in terms of gyros, the invention is fully and equally applicable to any plurality of devices which generate a rate or other drifting signal subject to noise. Such devices may include clocks, accelerometers, or any other system of multiple sensors intended to measure the same physical quantity over time. The correlation among the plurality of devices is entirely general and may assume any type of correlated pattern now known or later devised.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
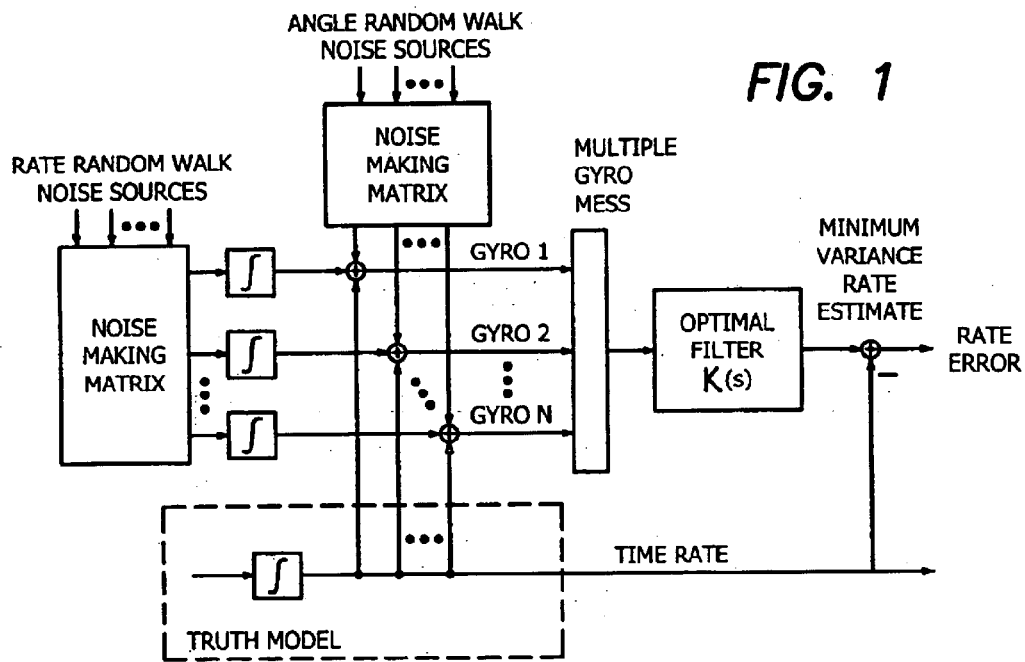
FIG. 1 is a block diagram of a mathematical model by which the Kalman filtering method of the invention is illustrated.

Gyros are described in the illustrated embodiment rather than accelerometers, since gyros benefit most from new methods for reducing drift. Consider first the use of an optimal minimum-variance filter. The main result is a complete optimal minimum variance method for combining and filtering multiple gyro measurements. A mathematical model for the methodology is shown in FIG. 1. An angle random walk (ARW) noise source 12 provides input signals through a mixing matrix 16 to a plurality of summing points 14(1), 14(2), . . . 14(N) for N gyros. A rate random walk (RRW) noise source 20 similarly provides input signals through a mixing matrix 18 to a plurality of summing points 14(1), 14(2), . . . 14(N) for the N gyros. The signals from matrix 18 are integrated in integrators 22(1), 22(2) . . . 22(N) and 24, the last of which corresponds to a true or perfect drift-free ideal gyro providing the true rate. This truth model is a mathematical construct and physically does not exist. The true and ARW and RRW noise signals are summed at points 14(1), 14(2), . . . 14 (N) and output as multiple gyro measurements going into the Kalman filter 10. The output of filter 10 is the desired minimum variance rate estimate for the N gyros. For illustration only (not used by the filter) the output of filter 10 is combined at summing point 26 with the negative true rate to define the rate error, which is the mathematical quantity of interest that is being minimized by this overall approach in a minimum-variance sense.

Here, an optimal filter 10 is provided to combine and smooth multiple gyro measurements (all oriented along the same axis) to produce a minimum-variance rate estimate (i.e., the mean-square value of the quantity "Rate Error" in FIG. 1 at output 28 is minimized by choice of this filter 10). Even though this rate estimate is analytically or mathematically derived from N gyros measurements as shown in FIG. 1, it is indistinguishable from a single rate measurement which might be taken from a single physical gyro. Consequently the resulting optimal minimum-variance rate estimate is denoted as a "virtual gyro" measurement.

Each gyro is considered to provide a signal $y_i = \omega + b_i + n_{1i}$ for i=1, . . . , N, where $y_i$ is the measured angular rate of the ith gyro, $\omega$ is the true rate, $b_i$ is a slowly varying random quantity of the ith gyro denoted as the gyro bias, $n_{1i}$ is a delta-correlated noise process of the ith gyro denoted as the angle-random walk ARW noise, and the vector of ARW noises is denoted as $v=[n_{11}, n_{12}, \ldots, n_{1N}]^T$. The measurement equation for the N gyro system then can be written in vector form as $y = b + 1\omega + v$, where each of the quantities are column vectors. The N gyros, however, are not independent, but have a drift or noise which is correlated because of the physical correlations of their manufacture and design. Hence, we can assign a covariance matrix R for ARW and Q for RRW representing the degree of noise correlation between each of the gyros relative to themselves and relative to each of the other gyros. Greater detail concerning these correlation matrices are given in the attached appendix.

The gain matrix K contained inside the minimum-variance filter 10 is an important quantity because it prescribes how the measurements are weighted with respect to each other, and completely characterizes how the dynamics of the filter 10 are assigned to optimally smooth the data. According to Kalman theory, the gain matrix K of the optimal filter 10 is a function of the (N+1)×(N+1) state covariance matrix P(t) which propagates according to a matrix Riccati differential equation (RDE) (See Bucy et.al., "*Filtering for Stochastic Processes with Application to Guidance*," Wiley, N.Y. 1968). The gain matrix K and optimal filter associated with the virtual gyro is characterized by the set of matrix equations below:

$$\dot{x} = K(t)(y - H\hat{x}) \quad (1)$$
$$\dot{P} = Q - PH^T R^{-1} HP$$
$$K(t) = P(t)H^T R^{-1}$$

where $\dot{P}$ is the time derivative of the state covariance matrix P(t); Q is an (N+1)×(N+1) augmented RRW covariance matrix; H is an N×(N+1) matrix in the measurement equation y=Hx+v, where the ARW noises have been stacked into the vector $v=[n_{11}, n_{12}, \ldots, n_{1N}]^T$; y is a vector representing the measured signals from N gyros, x is the state vector $x=[b^T,\omega]^T$; $\hat{x}$ is a minimum-variance estimate of the state vector x; $R^{-1}$ is the inverse of the N×N ARW covariance matrix R; and K(t) is the time dependent Kalman gain.

In general, the Riccati differential equation is a nonlinear matrix differential equation, and is very difficult to solve analytically. Because of this, solutions used in practice are based on integrating the differential equations numerically, or by calculating a steady-state solution using iterative numerical methods.

Unfortunately, there are two complications associated with the virtual gyro Riccati differential equation which prevent its solution using these standard approaches. The first problem is that a steady-state solution to the Riccati differential equation does not exist due to lack of "complete observability" as described in greater detail in the appendix (See also Bucy). Physically, this important property does not hold because the optimal estimate, however good, always has some non-zero component of drift.

The second problem, is that the presence of drifts causes the covariance P(t) to increase over time so that the numerical Riccati differential equation solution is unstable and becomes unbounded in the limit of time t going to infinity. Because of this divergence with time, solving for K(t) from equation (1) using finite-precision arithmetic tends to result in an unbounded or poorly behaved solution which has no physical meaning. This is because with finite-precision arithmetic, the increase in P cannot be perfectly cancelled by post-multiplication by $H^T$ and hence the product typically becomes large as time t goes to infinity. In contrast, the analytical solution of the Riccati differential equation for K(t) provides a method whereby a finite and meaningful solution can be obtained.

As shown in the attached appendix it is extremely fortunate that certain covariance terms vanish after postmultiplying by $HTR^{-1}$. This implies that the Kalman gain matrix approaches a steady-state value with time, even though the covariance from the RDE solution diverges. The resulting constant gain matrix $K_\infty$ (associated with the continuous-time filter implementation), is given by any of the following expressions, $$K_\infty = \qquad (2)$$

$$Q^{\frac{1}{2}}L^{\dagger/2}Q^{\frac{1}{2}}H^T R^{-1} = Q^{\frac{1}{2}}AD^{\dagger/2}Q^{\frac{1}{2}}H^T R^{-1} = Q^{\frac{1}{2}}\overline{A}\,\overline{D}^{-\frac{1}{2}}\overline{A}^T Q^{\frac{1}{2}}H^T R^{-1}$$

where $L=Q^{1/2}H^T R^{-1}HQ^{1/2}$, the symbol "$\dagger$" denotes the Moore-Penrose pseudoinverse (which always exists), and the matrices $A,\overline{A},D,\overline{D}$ are defined by an eigenvalue decomposition of the symmetric matrix L (discussed below, and in the appendix).

It is emphasized that these formulas allow the optimal filter to be determined completely algebraically. This avoids the need for numerical integration of the RDE, and is therefore not subject to rounding errors incurred from inexact cancellation of any unbounded term when forming the Kalman gain. Starting from equation (2) it can be shown that in the digital case, the equivalent constant filter gain $\overline{K}$ can be directly calculated using $$\overline{K} = S\begin{bmatrix} \overline{D}^{-\frac{1}{2}}\left(I - e^{-\overline{D}^{\frac{1}{2}}T}\right) & 0 \\ 0 & 0 \end{bmatrix} S^T H^T R^{-1} = \qquad (3)$$

$$Q^{1/2}\overline{A}\,\overline{D}^{-1/2}\left(I - e^{-\overline{D}^{\frac{1}{2}}T}\right)\overline{A}^T Q^{1/2}H^T R^{-1}$$

where $S=Q^{1/2}A$. Thus a major contribution of this research effort has been the complete and exact analytical solution to the virtual gyro Riccati matrix differential equation. This result is summarized at length and in detail in Bayard et.al. "Foundations of Virtual Gyro Synthesis" JPL D-21656 Jan. 21, 2002, which is attached and incorporated herein as an appendix, which was filed as part of the original application and is now available to the public in the file wrapper of this application, but which has been deleted from the printed specification for the sake of brevity.

We consider this result a major accomplishment in the field, and a large step forward in understanding virtual gyros and being able to synthesize them in practice. The analytic solution reveals a wealth of theoretical properties, and enables for the first time the consideration of practical implementations.

Many important properties of virtual gyros become transparent as a consequence of knowing the analytic solution to the underlying Riccati differential equation. These properties have been rigorously derived and documented in Bayard. The main highlights and their significance are briefly discussed below.

Even though the Riccati differential equation grows in an unbounded fashion as a function of time, the Kalman gain K(t) can be shown to approach a steady-state matrix. This result is both remarkable and fortuitous since it significantly simplifies implementations and, for the first time, enables practical schemes for realizing the optimal filter using a constant minimum-variance gain matrix $K_\infty$.

The analytic solution to the Riccati differential equation allows the development of a complete statistical theory which characterizes virtual gyro drift, and provides theoretical limits of improvement due to using an ensemble of correlated sensing devices as a single virtual sensor.

The transfer function of the minimum-variance filter is denoted by K(s) (in the Laplace variable s). K(s) has been analyzed in detail and its properties revealed as shown in the appendix. The transfer function K(s) indicates the presence of a marginally unstable pole, which would otherwise make computational implementation impossible if not properly understood and compensated. The analytic-based implementation approach provides a method to compensate for the unstable pole. In addition, a simple algebraic method has been developed for computing the optimal gain matrix $K_\infty$. With this result, the finite-precision arithmetic issues associated with the forming the gain matrix from the Riccati differential equation can be avoided completely in the implementation.

The notion of statistical common mode rejection has been characterized mathematically. For statistically uncorrelated gyros (i.e., where the Q and R matrices are diagonal), it has been shown in Bayard that component drifts add like parallel resistors in terms of their variances (e.g., in units of $rad^2/sec^3$). For example, the drift of a virtual gyro composed of N independent and identical devices will be 1/N of the individual device variance e.g., like N resistors R in parallel having overall resistance R/N. Note this corresponds to $1/\sqrt{N}$ of the individual device drift in units of $rad/sec^{3/2}$. Along the same lines, any single device with a large drift will not count much in the overall performance (like a large resistor among a parallel connection of resistors, which can be removed from consideration as a practical matter). Conversely, any device having drift significantly less than any of the other devices will dominate the performance of the virtual gyro (like a small resistance among a parallel connection of resistors).

Potential improvement in drift is much more impressive when the noise between devices is correlated (i.e., where the Q and R matrices have off-diagonal elements). Specifically, a key result in Bayard proves that the theoretically minimum drift attainable from combining N gyro devices having Rate Random Walk matrix $Q_b$ is given by, $$D_{vg} = \frac{1}{\text{Sum over elements of } Q_b^{-1}}$$

The units of $D_{vg}$ are $rad^2/sec^3$ which can be transformed to an equivalent one-sigma random walk growth in units of deg/hr over a one hour period. Drift values reported in the remainder of this document in units of deg/hr will have this specific interpretation. It is important to note that this formula gives the theoretically lowest value of gyro drift that is attainable by combining measurements from multiple gyro devices. In this light, it is emphasized that a real-time recursive processing filter which is theoretically capable of attaining this minimum drift bound is the subject of the present invention.

For correlated devices, interpretations given in Bayard indicate that the "principal component" drifts divided by their common-mode device fraction (a measure of how coherently the noise sources influence the multiple devices) add like parallel resistors. Roughly speaking, this says that the component drifts count to the extent that they influence multiple devices coherently (e.g., with common sign), and can be removed to the extent that they influence multiple devices incoherently (e.g., with randomized signs). This generalizes the intuitive notion that a noise which is additive to two devices but with opposite sign, can be eliminated by simple averaging. Noise eliminated by such favorable correlations can improve performance of the virtual gyro far beyond the $1/\sqrt{N}$ factor attainable using uncorrelated devices.

The main significance of the above results, is that virtual gyros can now be developed and implemented using N physical gyros. The present theory optimally combines individual sensing devices, and offers a method to improve overall performance characteristics beyond what is possible in any single device. A rough estimate, assuming that the correlation between devices in close spatial proximity is favorable, is that between one or two orders of magnitude improvement in drift is possible.

Consider now various practical virtual-gyro implementations. The procedure to compute the gain matrix $K_\infty$ for the continuous-time minimum-varance filter implementation, and the gain matrix $\overline{K}$ for the discrete-time minimum-variance filter is now given. The covariance matrices Q and R are assumed known from either engineering and/or testing of the gyros, because how the drift in one gyro is related to another can be determined empirically or by first principles. According to the invention, the filter which provides the best estimated value of the gyro rate by combining the N component gyro measurements is achieved when the minimum-variance filter gain $K_\infty$ (for the continuous-time problem) and $\overline{K}$ (for the discrete-time problem) is known. The steps for determining these gains from the Q and R matrices is given below.

Step (1) Form the (N+1)×(N+1) symmetric matrix $L=Q^{1/2}H^T R^{-1} H Q^{1/2}$

Step (2) Perform the eigenvalue decomposition of L ordered in such a manner that its zero eigenvalue is last, $$L = A D A^T$$

where A is an orthogonal matrix, and D is a diagonal matrix whose last diagonal element is zero. As a practical matter the smallest eigenvalue will never be exactly zero when using finite-precision arithmetic, in which case the smallest eigenvalue should be used to represent zero for the purposes of the eigenvalue ordering.

Step (3) Extract the N×N matrix $\overline{D}$ and (N+1)×N matrix $\overline{A}$ from D and A, respectively, as follows, $$D = \begin{bmatrix} \overline{D} & 0 \\ 0 & 0 \end{bmatrix}$$

$$A = [\overline{A} \vdots v]$$

Step (4) Form the auxiliary (N+1)×(N+1) matrix S, and the (N+1)×1 selection vector $e_{N+1}$ as follows, $$S = Q^{1/2} A$$

$$e_{N+1}^T = [0, \ldots, 0, 1]$$

Step (5) Form the Kalman gain for a continuous-time implementation as, $$K_\infty = Q^{1/2} \overline{A} \overline{D}^{-1/2} \overline{A}^T Q^{1/2} H^T R^{-1}$$

Step (6) Form the Kalman gain for a discrete-time (digital) implementation as, $$\overline{K} = S \begin{bmatrix} \overline{D}^{-1/2}\left(I - e^{-\overline{D}^{\frac{1}{2}}T}\right) & 0 \\ 0 & 0 \end{bmatrix} S^T H^T R^{-1} =$$

$$Q^{1/2} \overline{A} \, \overline{D}^{-1/2}\left(I - e^{-\overline{D}^{\frac{1}{2}}T}\right) \overline{A}^T Q^{1/2} H^T R^{-1}$$

Continuous-Time Implementation

The continuous-time filter implementation will be considered first. Using the Kalman gain, the virtual gyro rate estimate can be propagated in state-space form as, $$\dot{\hat{x}} = K_\infty(y - \hat{y}) = -K_\infty H \hat{x} + K_\infty y$$

$$\hat{\omega} = e_{N+1}^T \hat{x}$$

where the variables with the "hat" are the statistical minimum variance estimates. The transfer function from the measurements to the virtual gyro estimate can be written in the Laplace transform domain as, $$\hat{\omega}(s) = e_{N+1}^T (sI + K_\infty H)^{-1} K_\infty y(s)$$

where for this equation the quantities $\hat{\omega}$ and y are to be interpreted as Laplace-transformed variables. Unfortunately, this filter has a pole exactly at the origin. This implementation will not be reliable due to numerical rounding errors that can cause the pole to become unstable. A better approach is developed below. A main emphasis in the appendix has been to study the optimal filter matrix $K_\infty H$ closely, since it completely characterizes the poles of the Kalman filter.

Figure 2:
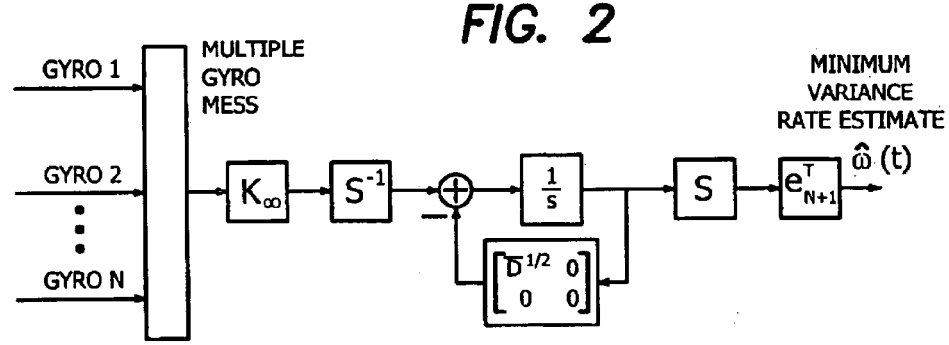
FIG. 2 is a block diagram of a continuous time model of the Kalman filtering method of the invention.

We turn now to the filter implementation. After some mathematical manipulation as set forth in detail in the appendix the continuous time optimal filter 10 of FIG. 2 can be realized. The optimal gain $K_\infty$ is a function of the drift rate signal model parameter $q_\omega$, which can be interpreted as a tuning parameter in this filter design. One might think of making $q_\omega$ large to minimize any dependence of the filter on the a-priori smoothness of the true rate. While theoretically possible, the poles of the optimal continuous-time filter approach negative infinity and become difficult to implement as $q_\omega$ becomes large. In contrast, the poles of the digital filter considered below move towards the origin in the limit as $q_\omega$ becomes large, and approach an easily implemented deadbeat condition. FIG. 2 is a diagram that illustrates the virtual gyro implementation using a continuous-time minimum variance filter. The last row of the input matrix $S^{-1}K_\infty$ (corresponding to the pure integrator state) should be set exactly to zero. This is dictated by the theory but must be explicitly enforced because it otherwise may not be so due to finite-precision arithmetic considerations. While the continuous-time filter can be implemented using analog circuitry, it is becoming more convenient to utilize computers and digital circuitry so that a digital implementation is considered next.

Digital (Discrete-Time) Implementation

Figure 3:
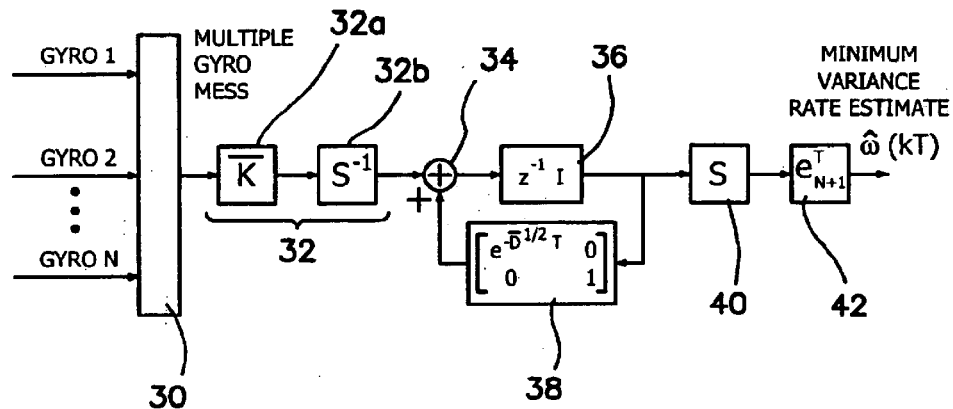
FIG. 3 is a block diagram of a discrete time model of the Kalman filtering method of the invention.

A digital implementation of the virtual gyro is considered in the case where individual gyro devices are sampled in time with sampling period T. FIG. 3 is a diagrammatic virtual gyro implementation using a discrete-time minimum variance filter. The matrix product $S^{-1}\overline{K}$ can be formed directly, or by using the alternative expression derived in the appendix, $$S^{-1}\overline{K} = S \begin{bmatrix} \overline{D}^{-\frac{1}{2}}\left(I - e^{-\overline{D}^{\frac{1}{2}}T}\right) & 0 \\ 0 & 0 \end{bmatrix} S^T H^T R^{-1} \quad (4)$$

The last row of the input matrix $S^{-1}\overline{K}$ (corresponding to the pure integrator state) should be set exactly to zero.

FIG. 3 is a clocked digital system. The analog signal from each gyro is sampled and digitized into a digital number or data point for each sampling period T. The N signals from the N gyros are assembled at buffer 30 into an N-vector which is then fed into a matrix multiplier 32 of first the $\overline{K}$ operator 32a and then the matrix $S^{-1}$ operator 32b, for which the combined operation is given by the above matrix equation (4). The matrix $\overline{K}$ is of dimension (N+1)×N and the matrix $S^{-1}$ operation 32b is of dimension (N+1)×(N+1) so that the input to the $S^{-1}\overline{K}$ operator 32 is an N vector, while the output is an N+1 vector. The matrix product result is clocked into summing node or adder 34. The output of summing node 34 is clocked into the operator $z^{-1}I$ (where I is the identity matrix, and $z^{-1}$ is the one-sample delay) which simply applies a one clock delay, which is then fed back through a smoothing matrix $$\begin{bmatrix} e^{-D\frac{1}{2}} & 0 \\ 0 & 1 \end{bmatrix}$$

operator 38 to summing node 34. At this point the modified value of the prior data point is added to the next data point. Meanwhile the previous addition result is forwarded and multiplied by the matrix S operator 40. The output of the matrix S operator 40 is multiplied by the $$e_{N+1}^T$$

matrix operator 42. The $$e_{N+1}^T$$

matrix is all zeroes except for the last row and column, which is 1. This $$e_{N+1}^T$$

matrix operator 42 simply picks out the last matrix element of its input which is the desired answer, i.e., the best estimate of the virtual gyro rate $\hat{\omega}(kT)$ for the kth sampling point. Elements 30–42 have been described as buffers or operators, but they are to be understood to comprise any type of signal processing circuit including custom logic circuits, firmware controlled digital processors, or software controlled computers.

A critical observation (analogous to the continuous-time case) is that the last row of the input matrix $S^{-1}\overline{K}$ is zero, so that the integrator state is unforced and will remain constant for all time. In practice, the designer should set the last row of $S^{-1}\overline{K}$ exactly to zero, since numerical rounding errors may otherwise cause it to have small nonzero entries. This approach completely resolves any potential stability problems arising from implementing the optimal filter.

EXAMPLES

Figure 4:
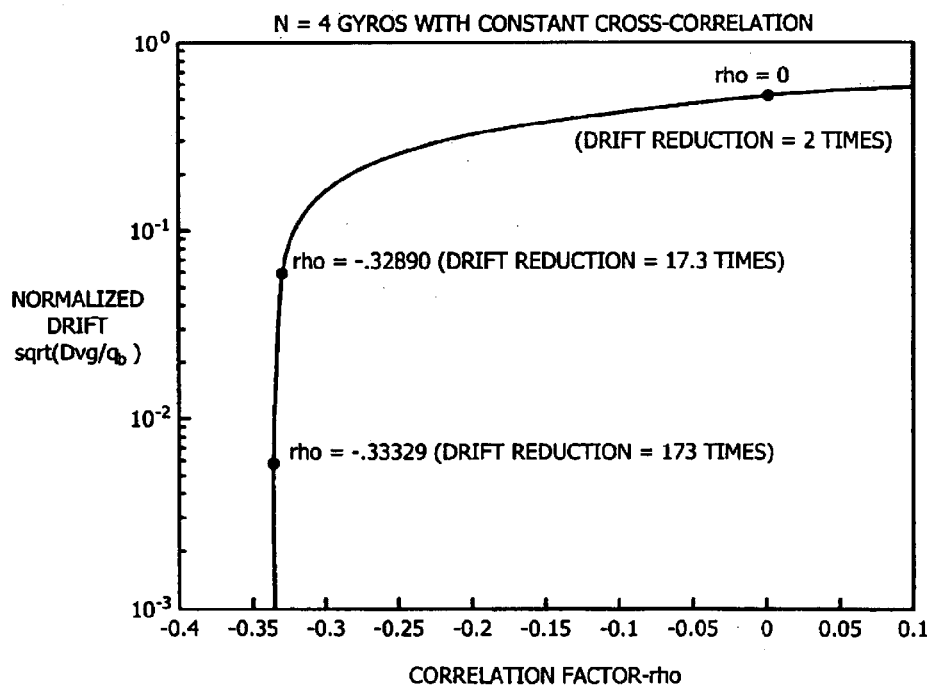
FIG. 4 is a graph of the normalized drift of a four component virtual gyro verses different correlation factor values.

Some simulation examples will demonstrate the virtual gyro implementation using the optimal digital filter depicted in FIG. 3. All simulations use N=4 gyros, with a sampling rate of T=1 sec, and a total running time of 400,000 secs (approximately 111 hours). The three examples correspond to the choices of the cross correlation factor $\rho$ being set equal to 0; −0.32890; and −0.33329 where it is assumed that all gyros have constant cross-correlation factor $\rho$. The normalized virtual gyro drift can be calculated by setting N=4 in (5.10) to yield a theoretical expression that predicts that a perfect driftless virtual gyro is obtained in the limit as the correlation factor $\rho$ approaches −⅓. The choices of p are intentionally chosen to successively approach this limiting value. They are plotted in FIG. 4 with a "*", which shows the normalized virtual gyro drift versus −$\rho$ and the expected drift reduction for each case. Specifically, the expected improvement for each of the choices of $\rho$ can be calculated based on the analytical solution, and then compared to a computer simulation. The case $\rho$=0 corresponds to uncorrelated gyro devices for which one expects an improvement of $\sqrt{N}=\sqrt{4}=2$. The choice $\rho$=−0.32890 corresponds to favorably correlated gyros with an improvement of 17.3 times, and the choice $\rho$=−0.33329 corresponds to very favorably correlated gyros with an improvement of 173 times.

Figure 5:
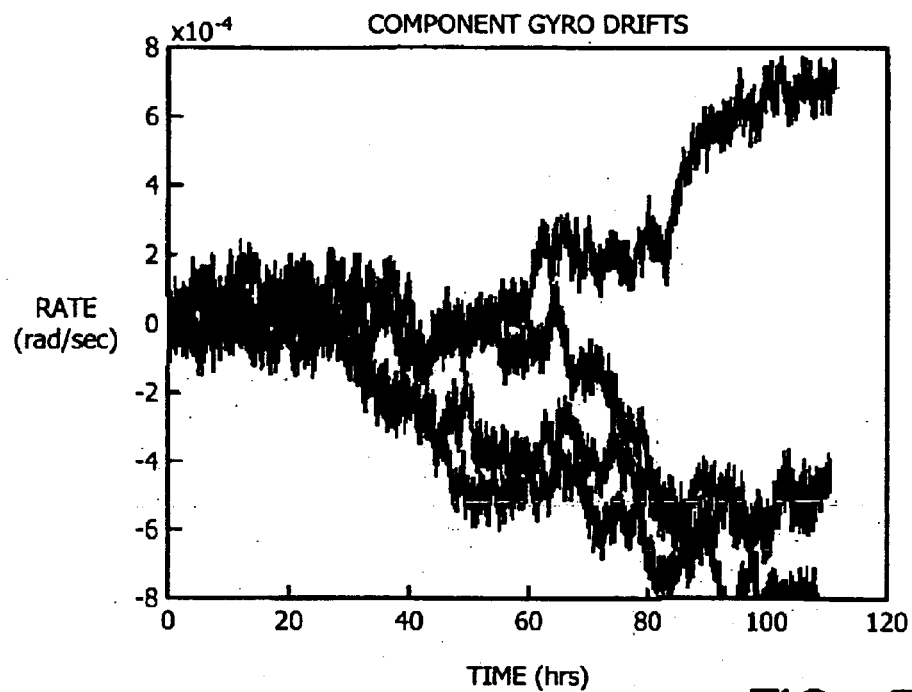
FIG. 5 is a graph of the drifting rate measurements from four uncorrelated component gyros verses time.
Figure 6:
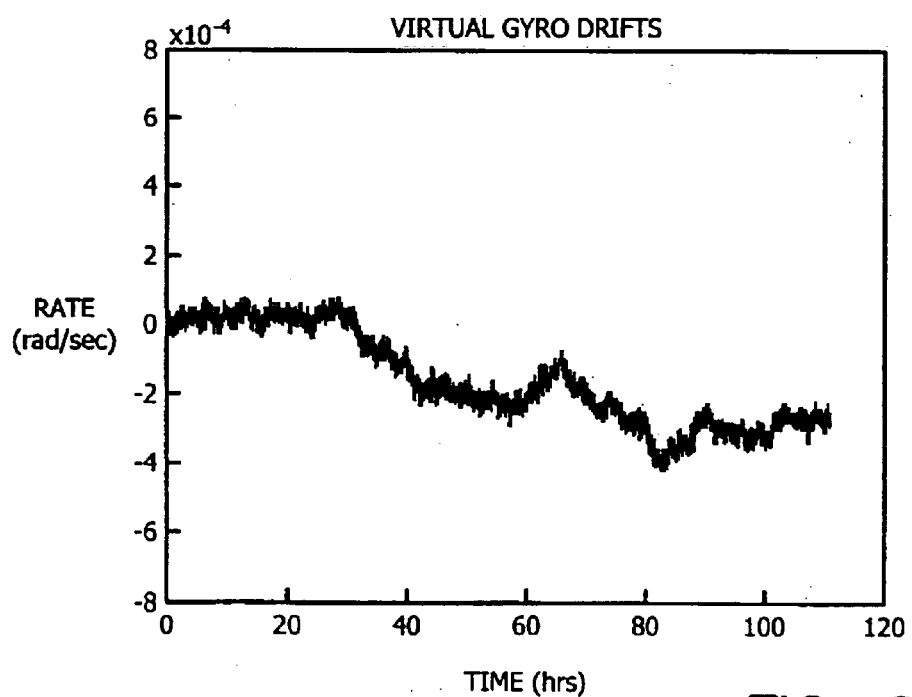
FIG. 6 is a graph of the optimal minimum variance rate of a virtual gyro using the component gyros of FIG. 5.

Consider first the uncorrelated gyro case. The first example considers the simulated choices N=4, $q_b$=6.5290e−013 (rad²/sec³), and $\rho$=0. Since $\rho$=0, the gyros are uncorrelated. Here, each gyro device by itself has a drift of 10 (deg/hr). Since the four gyros are uncorrelated by design, one would expect a drift reduction factor of $\sqrt{N}=\sqrt{4}=2$ or equivalently 10/2=5 (deg/hr) in the final virtual gyro design. The simulated time responses of the four gyro devices are shown in FIG. 5. The resulting virtual gyro response is shown in FIG. 6. The drift is reduced from 10 (deg/hr) for the individual gyros to a value of 4.9301 (deg/hr) for the combined gyros. This agrees well with the theoretically predicted value of 5 (deg/hr).

In the case of favorably correlated gyros the choices N=4, $q_b$=4.9131e−013 (rad²/sec³), and $\rho$=−0.32890. The gyro devices are intentionally correlated to give an expected theoretical factor of 17.3 magnitude reduction in drift when combined. Here, each gyro device by itself has a drift of 8.6747 (deg/hr). The theoretical virtual gyro drift can be calculated to give, 1.6350e−015 (rad²/sec³). This corresponds to a drift of 0.5 (deg/hr) in one hour, which is a 17.3 times magnitude improvement over the 8.6747 (deg/hr) component gyro drifts.

Figure 7:
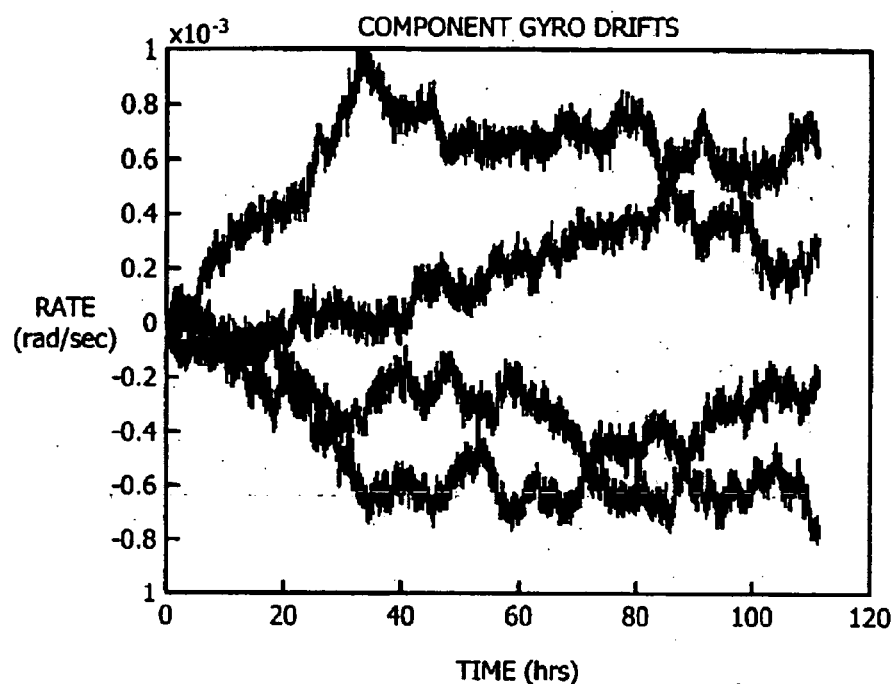
FIG. 7 is a graph of the drifting rate measurements from four favorably correlated component gyros verses time.
Figure 8:
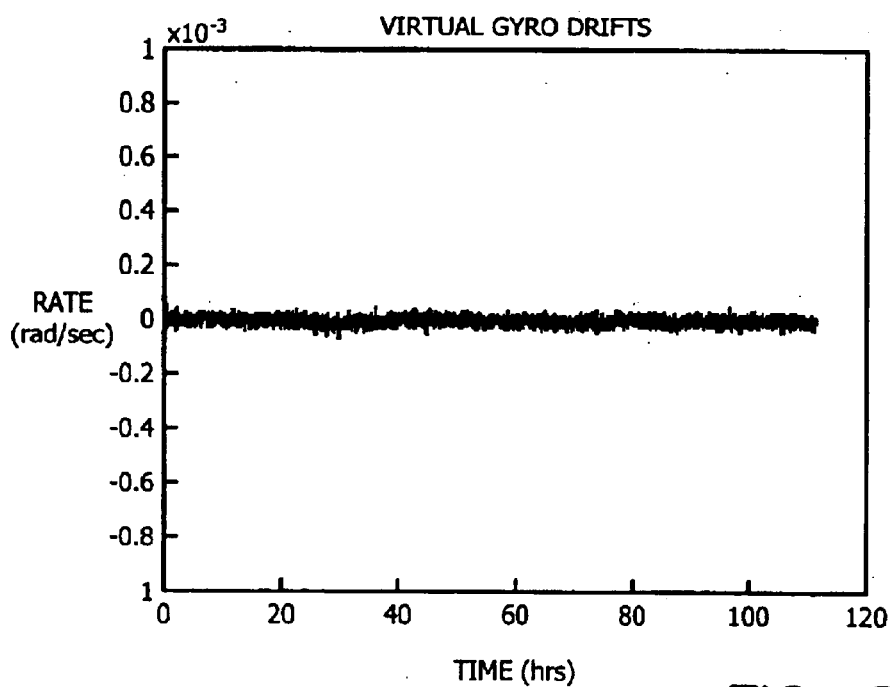
FIG. 8 is a graph of the optimal minimum variance rate of a virtual gyro using the component gyros of FIG. 7.

The time responses of the four gyro devices are simulated and shown in FIG. 7. The resulting virtual gyro response is shown in FIG. 8. The drift is reduced to a value of 0.51883 (deg/hr) by combining the devices. This is over an order of magnitude improvement relative to the individual gyro variances, and agrees well with the 0.5 (deg/hr) expected theoretical drift rate.

Consider finally a case of very favorably correlated gyros. Here we choose N=4, $q_b$=4.8969e−013 (rad²/sec³), and $\rho$=−0.33329 in (5.9). As discussed earlier, the gyro devices are intentionally correlated to give a factor of 173 times magnitude reduction in drift when combined. The RRW and ARW matrices are given specially as, $$Q_b = \begin{bmatrix} 4.8969e-13 & -1.632e-13 & -1.632e-13 & -1.632e-13 \\ -1.632e-13 & 4.8969e-13 & -1.632e-13 & -1.632e-13 \\ -1.632e-13 & -1.632e-13 & 4.8969e-13 & -1.632e-13 \\ -1.632e-13 & -1.632e-13 & -1.632e-13 & 4.8969e-13 \end{bmatrix} \left(\frac{rad^2}{sec^3}\right)$$

$$R = \begin{bmatrix} 7.6366e-10 & 0 & 0 & 0 \\ 0 & 7.6366e-10 & 0 & 0 \\ 0 & 0 & 7.6366e-10 & 0 \\ 0 & 0 & 0 & 7.6366e-10 \end{bmatrix} \left(\frac{rad^2}{sec^5}\right)$$

Here, each gyro device by itself has a drift of 8.6604 (deg/hr). The theoretical virtual gyro drift can be calculated by using N=4; $q_b$=4.8969e−013; ρ=−0.33329 to give 1.6e−017 (rad$^2$/sec$^3$). This corresponds to a expected theoretical drift of 0.05 (deg/hr) in one hour, which is a 173 times magnitude improvement over the 8.6604 (deg/hr) component gyro drifts.

Figure 9:
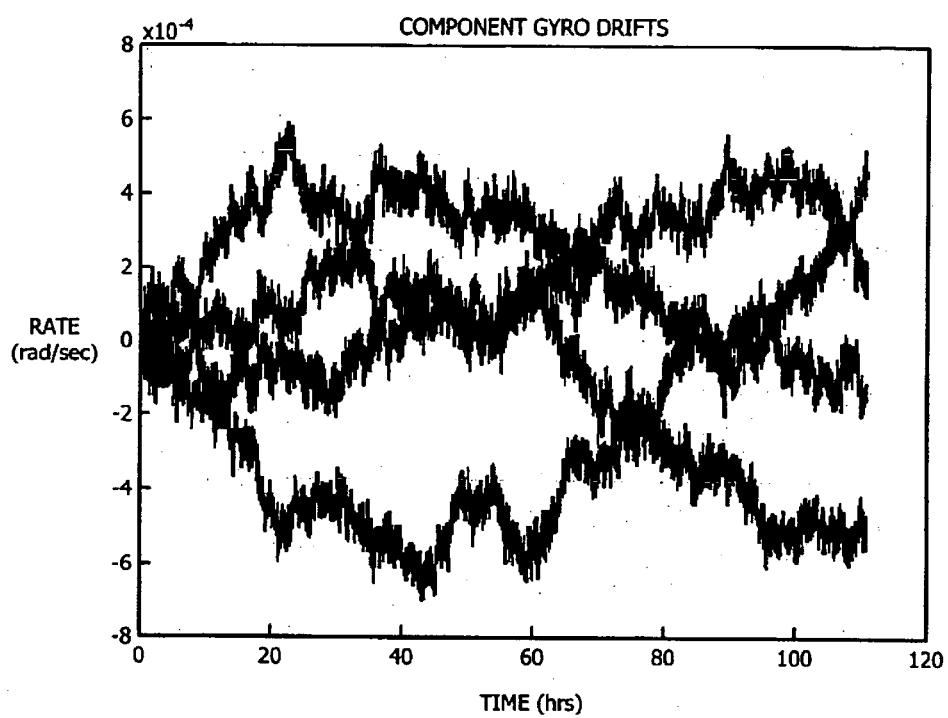
FIG. 9 is a graph of the drifting rate measurements from four very favorably correlated component gyros verses time.
Figure 10:
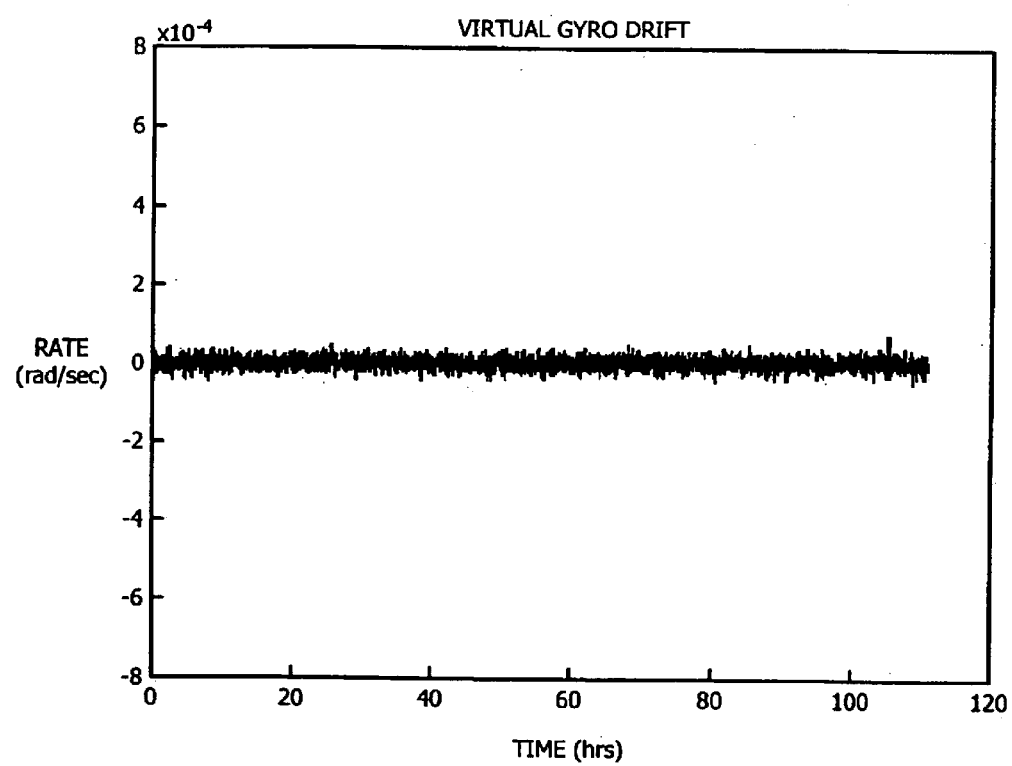
FIG. 10 is a graph of the optimal minimum variance rate of a virtual gyro using the component gyros of FIG. 9.

The time responses of the four gyro devices are simulated and shown in FIG. 9. A virtual gyro is designed using the digital observer approach shown in FIG. 3, with the choice of $q_\omega$=4.8414e−009 (rad$^2$/sec$^3$) for rate signal modeling. The resulting virtual gyro response is shown in FIG. 10. The drift is reduced by combining the devices to a value of 0.062335 (deg/hr). This is over two orders of magnitude improvement relative to the individual gyro devices, and agrees well with the 0.05 (deg/hr) expected theoretical drift rate.

In order to form the virtual gyro estimate, it is required to have an estimate of the bias on each of the component gyro devices. When an absolute rate reference is available, the bias estimation can be done individually on a device by device basis. However, such an approach is suboptimal in the sense that it does not take advantage of known correlations between devices. The bias calibration problem will be considered here from an optimal point of view that considers such correlations. As set forth in the appendix an analytic and asymptotic solution to calibration of the Riccati differential equation is possible.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of processing signals from multiple signal sensing devices, each having a drift component, to derive a higher accuracy output signal representing a best estimate of a virtual sensed signal, the method comprising:

measuring the signals from multiple drifting signal sensing devices;

combining the signal measurements from the multiple drifting signal sensing devices in a recursive processing filter, wherein the weights and smoothing properties of the recursive processing filter are determined to advantage using statistical correlations and noise characteristics of the multiple drifting signal sensing devices wherein combining the signal measurements from the multiple drifting signal sensing devices is performed by a continuous-time steady state Kalman filter to generate a minimum variance rate estimate, where the steady Kalman gain is algebraically computed and directly implemented to mitigate numerical problems associated with a diverging solution to the underlying Riccati differential equation.

2. A method of processing signals from multiple signal sensing devices, each having a drift component, to derive a higher accuracy output signal representing a best estimate of a virtual sensed signal, the method comprising:

measuring the signals from multiple drifting signal sensing devices;

combining the signal measurements from the multiple drifting signal sensing devices in a recursive processing filter, wherein the weights and smoothing properties of the recursive processing filter are determined to advantage using statistical correlations and noise characteristics of the multiple drifting signal sensing devices, wherein combining the signal measurements of the multiple drifting signal sensing devices comprises:

digitizing the rate measurements of the multiple rate sensing devices; and digitally combining the rate measurements of the multiple rate sensing devices using a digital steady state Kalman filter to generate a minimum variance rate estimate, where the steady Kalman gain is algebraically computed and directly implemented to mitigate numerical problems associated with a diverging solution to the underlying Riccati differential equation.

3. A method of processing signals from multiple rate sensing devices each providing a rate measurement to derive a higher accuracy output signal representing a best estimate of a virtual sensed rate, the method comprising:

measuring the rate measurements from multiple rate sensing devices; and combining the rate measurements from the multiple rate sensing devices in a recursive processing filter, wherein the weights and smoothing properties of the recursive processing filter are determined to advantage using statistical correlations and noise characteristics of the multiple rate sensing devices, wherein combining the rate measurements of the multiple rate sensing devices comprises:

digitizing the rate measurements of the multiple rate sensing devices; and digitally combining the rate measurements of the multiple rate sensing devices using a digital steady state Kalman filter to generate a minimum variance rate estimate, wherein digitally combining the rates of the multiple rates sensing devices using a digital steady state Kalman filter comprises:

determining N, wherein N is a number of rate sensing devices being measured;

determining $Q_b$ and R, wherein $Q_b$ and R are N×N covariance matrices whose elements correspond to the correlation factors between the N multiple rate sensing devices;

choosing a random walk intensity $q_\omega$ for a true rate, and forming $$Q = \begin{bmatrix} Q_b & 0 \\ 0 & q_\omega \end{bmatrix},$$

wherein Q is an (N+1)×(N+1) covariance matrix;

generating $L=Q^{1/2}H^T R^{-1} H Q^{1/2}$, wherein L is an (N+1)×(N+1) matrix, wherein H represents an N×(N+1) matrix in a measurement equation $y=Hx+v=b+1\omega+v$; wherein $\omega$ represents a true rate along a single axis; wherein b represents a vector of rate biases; wherein x is a state vector $x=[b^T,\omega]^T$; wherein v is a vector of angle random walk (ARW) noises that have been stacked into the vector form $v=[n_{11},n_{12},\ldots,n_{1N}]^T$; and wherein y is a vector representing the measured signals from N gyros;

performing an eigenvalue decomposition of L ordered such that its zero eigenvalue is last wherein $L=ADA^T$, and wherein D is a diagonal matrix and A is an orthogonal matrix;

extracting a N×N submatrix $\overline{D}$ from the matrix D according $$D = \begin{bmatrix} \overline{D} & 0 \\ 0 & 0 \end{bmatrix};$$

extracting a (N+1)×N submatrix $\overline{A}$ from the matrix A according to $A=[\overline{A}:v]$;

generating a steady state Kalman gain as $$\overline{K} = S \begin{bmatrix} \overline{D}^{-1/2} \left(I - e^{-\overline{D}^{\frac{1}{2}}T}\right) & 0 \\ 0 & 0 \end{bmatrix} S^T H^T R^{-1} =$$

$$Q^{1/2} \overline{A} \overline{D}^{-1/2} \left(I - e^{-\overline{D}^{1/2}T}\right) \overline{A}^T Q^{1/2} H^T R^{-1}$$

wherein $S=Q^{1/2}A$ and wherein T is a sampling period; and, processing the measurements from the multiple rate sensing devices according to the recursive processing filter, the recursive processing filter having an output and modeled as, $$\hat{\xi}((k+1)T) = \begin{bmatrix} e^{-\overline{D}^{\frac{1}{2}}T} & 0 \\ 0 & 1 \end{bmatrix} \hat{\xi}(kT) + S^{-1}\overline{K}y(kT)$$

$$\hat{\omega}(kT) = e_{N+1}^T S \hat{\xi}(kT)$$

wherein x represents a vector $x=[b^T,\omega]^T$; $\xi(kT)=S^{-1}x(kT)$ is a filter state at the $k^{th}$ sampling point;

$$e_{N+1}^T = [0, \ldots, 0, 1]$$

is a selection vector; and $\hat{\omega}(kT)$ is the output of the recursive filter which represents the best estimate of the virtual sensed rate for the $k^{th}$ sampling point.

4. The method of claim 3 wherein $S^{-1}\overline{K}$ is a matrix product having a last row, wherein the last row of the matrix product $S^{-1}\overline{K}$ is explicitly set to zero; and wherein $$\begin{bmatrix} e^{-\overline{D}^{\frac{1}{2}}T} & 0 \\ 0 & 1 \end{bmatrix}$$

is a matrix having an intended "1" in the lower right-hand corner element, wherein the lower right hand corner element is explicitly set to unity to enable practical implementations of the filter.

5. A method of processing signals from multiple rate sensing devices each providing a rate measurement to derive a higher accuracy output signal representing a best estimate of a virtual sensed rate, the method comprising:

measuring the rate measurements from multiple rate sensing devices; and combining the rate measurements from the multiple rate sensing devices in a recursive processing filter, wherein the weights and smoothing properties of the recursive processing filter are determined to advantage using statistical correlations and noise characteristics of the multiple rate sensing devices, wherein combining the rate measurements from the multiple rate sensing devices is performed by a continuous-time steady state Kalman filter to generate a minimum variance rate estimate, wherein combining the rate measurements of multiple rate sensing devices performed by the continuous-time steady state Kalman filter comprises:

determining N, wherein N is a number of multiple rate sensing devices being measured;

determining $Q_b$ and R, wherein $Q_b$ and R are N×N covariance matrices whose elements correspond to correlation factors between the N multiple rate sensing devices;

choosing a random walk intensity $q_\omega$ for a true rate; and forming $$Q = \begin{bmatrix} Q_b & 0 \\ 0 & q_\omega \end{bmatrix},$$

wherein Q is a (N+1)×(N+1) covariance matrix;

generating $L=Q^{1/2}H^T R^- HQ^{1/2}$ wherein L is a (N+1)×(N+1) matrix, wherein H represents a N×(N+1) matrix in a measurement equation y=Hx+v=b+1ω+v; wherein ω represents a true rate along a single axis; wherein b represents a vector of rate biases; wherein x is a state vector $x=[b^T,\omega]^T$; wherein v is a vector of ARW noises having been stacked into vector form $v=[n_{11},n_{12},\ldots,n_{1N}]^T$; and wherein y is a vector representing a measured signals from N gyros;

performing an eigenvalue decomposition of L ordered such that its zero eigenvalue is last wherein $L=ADA^T$, wherein D is a diagonal matrix and A is an orthogonal matrix;

extracting a N×N submatrix $\overline{D}$ from matrix D according to $$D = \begin{bmatrix} \overline{D} & 0 \\ 0 & 0 \end{bmatrix}$$

extracting a (N+1)×N submatrix $\overline{A}$ from matrix A according to $A=[\overline{A}:v]$;

generating a steady state Kalman gain $K_\infty$ wherein $$K_\infty = Q^{1/2}\overline{AD}^{-1/2}\overline{A}^T Q^{1/2} H^T R^{-1}$$

processing the measurements from the multiple rate sensing devices according to the recursive processing filter having an output, wherein the recursive processing filter is modeled as, $$\dot{\hat{\xi}} = \begin{bmatrix} -\overline{D}^{\frac{1}{2}} & 0 \\ 0 & 0 \end{bmatrix}\hat{\xi} + S^{-1}K_\infty y$$

$$\hat{\omega} = e_{N+1}^T S\hat{\xi}$$

wherein $S=Q^{1/2}A$; wherein x represents the vector $x=[b^T,\omega]^T$; wherein $\xi=S^{-1}x$ is a filter state; wherein $$e_{N+1}^T = [0, \ldots, 0, 1]$$

is a selection vector; and wherein $\hat{\omega}$ is the output of the recursive processing filter which represents the best estimate of the virtual sensed rate.

6. The method of claim 5, wherein $S^{-1}K_\infty$ is a matrix product having a last row, wherein the last row of $S^{-1}K_\infty$ is explicitly set to zero; and wherein $$\begin{bmatrix} -\overline{D}^{\frac{1}{2}} & 0 \\ 0 & 0 \end{bmatrix}$$

is a matrix having an intended "0" in the lower right-hand corner element, wherein the lower right-hand corner element matrix is explicitly set to zero to enable practical implementations of the filter.

7. A method of processing signals from multiple rate sensing devices each providing a rate measurement to derive a higher accuracy output signal representing a best estimate of a virtual sensed rate, the method comprising:

measuring the rate measurements from multiple rate sensing devices; and combining the rate measurements from the multiple rate sensing devices in a recursive processing filter, wherein the weights and smoothing properties of the recursive processing filter are determined to advantage using statistical correlations and noise characteristics of the multiple rate sensing devices, wherein combining the rate measurements of the multiple rate sensing devices comprises:
digitizing the rate measurements of the multiple rate sensing devices; and
digitally combining the rate measurements of the multiple rate sensing devices using a digital steady state Kalman filter to generate a minimum variance rate estimate, wherein combining the rate measurements from the multiple rate sensing devices using a digital steady state Kalman filter to generate a minimum variance rate estimate comprises:

sampling N analog signals from N rate sensing devices over a period, T;

digitizing the sampled N analog signals into a digital data point for each sampling period T of each rate sensing device;

assembling the N digitized signals from the N rate sensing devices into an N-vector;

processing the N-vector by multiplying it with a matrix $\overline{K}$ operator to generate a $\overline{K}$ product signal;

processing the $\overline{K}$ product signal by multiplying it with a matrix $S^{-1}$ operator to generate a $S^{-1}$ product signal;

inputting the $S^{-1}$ product signal during a $k^{th}$ sampling period into a first input of a summing node having two inputs;

outputting a difference of the two inputs of the summing node to a delay operator having contents;

delaying the contents of the delay operator by one sampling period, T;

feeding back a delayed output of the delay operator to a matrix operator modeled by $$\begin{bmatrix} e^{-\overline{D}^{1/2}T} & 0 \\ 0 & 1 \end{bmatrix}$$

to generate a feedback signal;

inputting the feedback signal to a second one of the inputs to the summing node wherein the feedback signal is added to the $S^{-1}$ product signal generated in a k+1 sampling period;

processing the contents of the delay operator for a $k^{th}$ sampling period by multiplying it with a matrix S operator to generate an S product signal; and extracting a last matrix element of the S product signal as the best estimate of the virtual sensed rate, $\hat{\omega}(kT)$ for the $k^{th}$ sampling point.

8. An apparatus for processing signals from multiple signal sensing devices each providing a measurement to derive a higher accuracy output signal representing a best estimate of a virtual sensed rate, comprising:

means for measuring the signal from the multiple drifting signal sensing devices;

means for combining measured signals from the multiple drifting signal sensing devices in a recursive processing filter, and means for determining the weights and smoothing properties of the recursive processing filter using the statistical correlations and noise characteristics of the multiple drifting signal sensing devices, wherein the means for combining the measured signals from the multiple drifting signal sensing devices comprises a continuous-time steady state Kalman filter to generate a minimum variance rate estimate, where the steady Kalman gain is algebraically computed and directly implemented to mitigate numerical problems associated with a diverging solution to the underlying Riccati differential equation.

9. The apparatus of claim 8 wherein the means for combining the measured rates from the multiple rate sensing devices comprises means for digitizing the rates of multiple rate sensing devices and means for digitally combining the rates from multiple rate sensing devices using a digital steady state Kalman filter.

10. An apparatus for processing signals from multiple rate sensing devices each providing a rate measurement to derive a higher accuracy output signal representing a best estimate of a virtual sensed rate, comprising:

means for measuring the rate from the multiple rate sensing devices; and means for combining measured rates from the multiple rate sensing devices in a recursive processing filter and means for determining the weights and smoothing properties of the recursive processing filter using the statistical correlations and noise characteristics of the multiple rate sensing devices, wherein the means for combining the measured rates from the multiple rate sensing devices comprises means for digitizing the rates of multiple rate sensing devices and means for digitally combining the rates from multiple rate sensing devices using a digital steady state Kalman filter, wherein the means for digitally combining the rates from the multiple rates sensing devices signals using a digital steady state Kalman filter comprises:

means for determining N, wherein N is a number of multiple rate sensing devices being measured;

means for determining $Q_b$ and R, wherein $Q_b$ and R are N×N covariance matrices whose elements correspond to correlation factors between the N multiple rate sensing devices;

means for choosing a random walk intensity $q_\omega$ for a true rate, and forming $$Q = \begin{bmatrix} Q_b & 0 \\ 0 & q_\omega \end{bmatrix};$$

wherein Q is an (N+1)×(N+1) covariance matrix;

means for generating $L=Q^{1/2}H^T R^{-1} H Q^{1/2}$, wherein L is an (N+1)×(N+1) matrix, wherein H represents an N×(N+1) matrix in a measurement equation $y=Hx+v=b+1\omega+v$; wherein $\omega$ represents a true rate along a single axis; wherein b represents a vector of rate biases; wherein x is a state vector $x=[b^T,\omega]^T$; wherein v is a vector of angle random walk (ARW) noises that have been stacked into the vector form $v=[n_{11},n_{12},\ldots,n_{1N}]^T$; and wherein y is a vector representing the measured signals from N gyros;

means for performing an eigenvalue decomposition of L ordered such that its zero eigenvalue is last wherein $L=ADA^T$, and wherein D is a diagonal matrix and A is an orthogonal matrix;

means for extracting a N×N submatrix $\overline{D}$ from the matrix D according $$D = \begin{bmatrix} \overline{D} & 0 \\ 0 & 0 \end{bmatrix};$$

means for extracting a (N+1)×N submatrix $\overline{A}$ from the matrix A according to $A=[\overline{A}:v]$;

means for generating a steady state Kalman gain as $$\overline{K} = S \begin{bmatrix} \overline{D}^{-1/2}\left(I - e^{-\overline{D}^{\frac{1}{2}}T}\right) & 0 \\ 0 & 0 \end{bmatrix} S^T H^T R^{-1} =$$

$$Q^{1/2}\overline{A}\overline{D}^{-1/2}\left(I - e^{-\overline{D}^{\frac{1}{2}}T}\right)\overline{A}^T Q^{1/2} H^T R^{-1}$$

wherein $S=Q^{1/2}A$ and wherein T is a sampling period; and, means for processing the rates from the multiple rate sensing devices according to the recursive processing filter, the recursive processing filter having an output and modeled as, $$\hat{\xi}((k+1)T) = \begin{bmatrix} e^{-\overline{D}^{\frac{1}{2}}T} & 0 \\ 0 & 1 \end{bmatrix}\hat{\xi}(kT) + S^{-1}\overline{K}y(kT)$$

$$\hat{\omega}(kT) = e_{N+1}^T S\hat{\xi}(kT)$$

wherein x represents a vector $x=[b^T,\omega]^T$; wherein $\xi(kT)=S^{-1}x(kT)$ is a filter state at the $k^{th}$ sampling point;

$$e_{N+1}^T = [0,\ldots,0,1]$$

is a selection vector; and wherein $\hat{\omega}(kT)$ is the output of the recursive filter which represents the best estimate of the virtual sensed rate for the $k^{th}$ sampling point.

11. The apparatus of claim 10 wherein $S^{-1}\overline{K}$ is a matrix product having a last row, wherein the last row of the matrix product $S^{-1}\overline{K}$ is explicitly set to zero; and wherein $$\begin{bmatrix} e^{-\overline{D}^{\frac{1}{2}}T} & 0 \\ 0 & 1 \end{bmatrix}$$

is a matrix having an intended "1" in the lower right-hand corner element, wherein the right-hand corner element is explicitly set to unity to enable practical implementations of the filter.

12. An apparatus for processing signals from multiple rate sensing devices each providing a rate measurement to derive a higher accuracy output signal representing a best estimate of a virtual sensed rate, comprising:

means for measuring the rate from the multiple rate sensing devices; and means for combining measured rates from the multiple rate sensing devices in a recursive processing filter, and means for determining the weights and smoothing properties of the recursive processing filter using the statistical correlations and noise characteristics of the multiple rate sensing devices, wherein the means for combining the measured rates from the multiple rate sensing devices comprises a continuous-time steady state Kalman filter to generate a minimum variance rate estimate, wherein the means for combining the measured rates of multiple rate sensing devices comprising a continuous-time steady state Kalman filter further comprises:

means for determining N, wherein N is a number of multiple rate sensing devices being measured;

means for determining $Q_b$ and R, wherein $Q_b$ and R are N×N covariance matrices whose elements correspond to correlation factors between the N multiple rate sensing devices;

means for choosing a random walk intensity $q_\omega$ for a true rate; and means for forming $$Q = \begin{bmatrix} Q_b & 0 \\ 0 & q_\omega \end{bmatrix},$$

wherein Q is a (N+1)×(N+1) covariance matrix;

means for generating $L=Q^{1/2}H^T R^{-1} H Q^{1/2}$ wherein L is a (N+1)×(N+1) matrix, wherein H represents a N×(N+1) matrix in a measurement equation $y=Hx+v=b+1\omega+v$; wherein $\omega$ represents a true rate along a single axis; wherein b represents a vector of rate biases; wherein x is a state vector $x=[b^T,\omega]^T$; wherein v is a vector of ARW noises having been stacked into vector form $v=[n_{11},n_{12}, \ldots, n_{1N}]^T$; and wherein y is a vector representing the measured signals from N gyros;

means for performing an eigenvalue decomposition of L ordered such that its zero eigenvalue is last wherein $L=ADA^T$, wherein D is a diagonal matrix and A is an orthogonal matrix;

means for extracting a N×N submatrix $\overline{D}$ from matrix D according to $$D = \begin{bmatrix} \overline{D} & 0 \\ 0 & 0 \end{bmatrix}$$

means for extracting a (N+1)×N submatrix $\overline{A}$ from matrix A according to $A=[\overline{A}:v]$;

means for generating a steady state Kalman gain $K_\infty$ wherein $$K_\infty = Q^{1/2}\overline{AD}^{-1/2}H^T R^{-1}$$

means for processing measured rates from the multiple rate sensing devices according to the recursive processing filter having an output, wherein the recursive processing filter is modeled as, $$\dot{\hat{\xi}} = \begin{bmatrix} -\overline{D}^{\frac{1}{2}} & 0 \\ 0 & 0 \end{bmatrix} \hat{\xi} + S^{-1} K_\infty y$$

$$\hat{\omega} = e_{N+1}^T S \hat{\xi}$$

wherein $S=Q^{1/2}A$; wherein x represents a vector $x=[b^T,\omega]^T$; wherein $\xi=S^{-1}x$ is a filter state; wherein $$e_{N+1}^T = [0, \ldots, 0, 1]$$

is a selection vector; and wherein $\hat{\omega}$ is the output of the recursive processing filter which represents the best estimate of the virtual sensed rate.

13. The apparatus of claim 12, wherein $S^{-1}K_\infty$ is a matrix product having a last row, wherein the last row of $S^{-1}K_\infty$ is explicitly set to zero; and where $$\begin{bmatrix} -\overline{D}^{\frac{1}{2}} & 0 \\ 0 & 0 \end{bmatrix}$$

is a matrix having an intended "0" in the lower right-hand corner element, wherein the lower right hand corner element is explicitly set to zero to enable practical implementations of the filter.

14. An apparatus for processing signals from multiple rate sensing devices each providing a rate measurement to derive a higher accuracy output signal representing a best estimate of a virtual sensed rate, comprising:

means for measuring the rate from the multiple rate sensing devices; and means for combining measured rates from the multiple rate sensing devices in a recursive processing filter, and means for determining the weights and smoothing properties of the recursive processing filter using the statistical correlations and noise characteristics of the multiple rate sensing devices, wherein the means for combining the measured rates from the multiple rate sensing devices comprises means for digitizing the rates of multiple rate sensing devices and means for digitally combining the rates from multiple rate sensing devices using a digital steady state Kalman filter, wherein the means for combining the measured rates of the multiple rate sensing devices using a digital steady state Kalman filter to generate a minimum variance rate estimate further comprises:

means for sampling N analog signals from N rate sensing devices over a period, T;

means for digitizing the sampled N analog signals into a digital data point for each sampling period T of each rate sensing device;

means for assembling the N digitized signals from the N rate sensing devices into an N-vector;

means for processing the N-vector by multiplying it with a matrix $\overline{K}$ operator to generate a $\overline{K}$ product signal;

means for processing the $\overline{K}$ product signal by multiplying it with a matrix $S^{-1}$ operator to generate a $S^{-1}$ product signal;

means for inputting the $S^{-1}$ product signal during a kth sampling period into a first input of a summing node having two inputs;

means for outputting the difference of the two inputs of the summing node to a delay operator;

means for delaying the contents of the delay operator by one sampling period, T;

means for feeding back a delayed output of the delay operator to a matrix operator modeled by $$\begin{bmatrix} e^{-\overline{D}^{1/2}T} & 0 \\ 0 & 1 \end{bmatrix}$$

to generate a feedback signal;

means for inputting the feedback signal to a second one of the inputs to the summing node such that it is added to the $S^{-1}$ product signal generated in a k+1 sampling period;

means for processing the contents of the delay operator for a $k^{th}$ sampling period by multiplying it with a matrix S operator to generate an S product signal; and means for extracting a last matrix element of the S product signal as the best estimate of the virtual sensed rate, $\hat{\omega}(kT)$ for the $k^{th}$ sampling point to generate a minimum variance rate estimate.

15. The apparatus of claim 8 wherein each means comprises a firmware controlled digital processor for performing the recited function.

16. The apparatus of claim 8 wherein each means comprises a programmed portion of a digital software controlled computer for performing the recited function.

17. The apparatus of claim 8 wherein at least one of the means comprises a logic circuit for performing the recited function.

18. The apparatus of claim 8 wherein at least one of the means comprises a firmware controlled digital processor for performing the recited function.

19. The apparatus of claim 8 wherein at least one of the means comprises a programmed portion of a digital software controlled computer for performing the recited function.

20. The method of claim 1 wherein the multiple rate sensing devices are multiple gyros producing signals and the measuring and the combining elements use the signals from the multiple gyros.

21. The apparatus of claim 8 wherein the multiple rate sensing devices are multiple gyros producing signals and wherein the means for measuring and the means for combining use the signals from the multiple gyros.

* * * * *

UNITED STATES PATENT AND TRADEMARK OFFICE
CERTIFICATE OF CORRECTION

PATENT NO.    : 6,882,964 B2
DATED         : April 19, 2005
INVENTOR(S)   : David S. Bayard and Scott R. Ploen It is certified that error appears in the above-identified patent and that said Letters Patent is hereby corrected as shown below:

Column 1,
Line 4, should include the following statement:
-- The invention described herein was made in the performance of work under a NASA contract, and is subject to the provisions of Public Law 96-517 (35 U.S.C. 202) in which the Contractor has elected to retain title --.

Signed and Sealed this

Ninth Day of August, 2005

JON W. DUDAS
*Director of the United States Patent and Trademark Office*